(12) United States Patent
Husser et al.

(10) Patent No.: US 7,869,208 B2
(45) Date of Patent: Jan. 11, 2011

(54) ELECTRONICS COMPONENT PACKAGING FOR POWER CONVERTER

(75) Inventors: Jon Husser, McNabb, IL (US); Keith E. Dixler, Peoria, IL (US); Thomas M. Baker, Peoria, IL (US); Robert R. Sychra, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 99 days.

(21) Appl. No.: 12/384,183

(22) Filed: Apr. 1, 2009

(65) Prior Publication Data

US 2010/0165575 A1 Jul. 1, 2010

Related U.S. Application Data

(60) Provisional application No. 61/204,021, filed on Dec. 31, 2008.

(51) Int. Cl.
   *H05K 7/20* (2006.01)
(52) U.S. Cl. ..................................... 361/690
(58) Field of Classification Search ................ 361/690, 361/692, 693, 697, 720; 174/15.1, 17 VA
   See application file for complete search history.

(56) References Cited

U.S. PATENT DOCUMENTS

| | | | |
|---|---|---|---|
| 4,010,489 A | 3/1977 | Bourbeau et al. | |
| 5,436,793 A * | 7/1995 | Sanwo et al. ................. | 361/689 |
| 5,504,378 A | 4/1996 | Lindberg et al. | |
| 5,828,554 A | 10/1998 | Donegan et al. | |
| 5,847,451 A | 12/1998 | Ohtaki et al. | |
| 5,892,279 A | 4/1999 | Nguyen | |
| 6,061,241 A | 5/2000 | Handforth et al. | |
| 6,061,245 A | 5/2000 | Ingraham et al. | |
| 6,384,346 B1 | 5/2002 | Chang et al. | |
| 6,384,492 B1 | 5/2002 | Iversen et al. | |
| 6,421,241 B1 | 7/2002 | Azotea | |
| 6,434,016 B2 | 8/2002 | Zeng et al. | |
| 6,661,659 B2 | 12/2003 | Tamba et al. | |
| 6,693,797 B2 | 2/2004 | Faneuf et al. | |
| 7,068,507 B2 | 6/2006 | Pfeifer et al. | |
| 7,153,143 B2 | 12/2006 | Muench | |
| 7,180,212 B2 | 2/2007 | Anwar et al. | |
| 7,225,538 B2 | 6/2007 | Eldridge et al. | |
| 7,333,331 B2 | 2/2008 | Yamabuchi et al. | |

* cited by examiner

*Primary Examiner*—Shawn Riley
(74) *Attorney, Agent, or Firm*—Liell & McNeil (57) ABSTRACT

Assembling a power converter for a multiple phase electric drive propulsion system in a machine includes arranging a plurality of rectangular capacitor units of a capacitor subassembly for conditioning electrical power in the power converter in a first packaging arrangement. In the first packaging arrangement, major capacitor axes of each one of the capacitor units are co-linear with one another and minor capacitor axes of each one of the capacitor units are oriented parallel but not co-linear with one another. Assembling the power converter further includes arranging a plurality of IGBT modules of a transistor subassembly for power switching in the power converter in a second packaging arrangement. In the second packaging arrangement major module axes of each one of the IGBT modules are oriented parallel but not co-linear with one another and minor module axes of each one of the IGBT modules are co-linear with one another. The capacitor subassembly and the transistor subassembly are supported in the first packaging arrangement and in the second packaging arrangement for service in a power converter housing.

19 Claims, 4 Drawing Sheets

ELECTRONICS COMPONENT PACKAGING FOR POWER CONVERTER

This application claims the benefit of U.S. Provisional Application No. 61/204,021, filed Dec. 31, 2008.

TECHNICAL FIELD

The present disclosure relates generally to power converters of a type used in electric propulsion system for machines, and relates more particularly to packaging components of such a power converter for heat transference and packing density.

BACKGROUND

A device known generally as a power converter is often used in electrical systems to receive electrical power from an electrical power source such as a generator, condition the electrical power, and thenceforth supply the conditioned electrical power to one or more electrically powered devices. Operation of a power converter in this manner tends to generate heat, which must be dissipated to optimize efficiency of the power converter and in some instances to avoid damage or degradation of certain of the components. Many standard power converters utilize an air cooling mechanism such as a fan to blow cooling air over the various components and dissipate heat. This strategy may work well in certain environments, however, in others such as debris-laden or wet environment, air cooling has its limitations. Certain manufacturers have proposed power converter designs wherein the power converter is positioned within a liquid sealed housing to protect the power converter electronic components from debris, water, etc. Fluid sealing of power converter components within a housing, however, tends to complicate heat rejection, and generally makes air cooling ineffective.

As an alternative to air cooling, one strategy for dissipating heat from power converter electronic components involves the use of a cooling plate or the like to circulate a cooling fluid through or past a heat exchanger which is in thermal contact with electronic components of the power converter. While certain liquid cooling strategies have seen some success, there is room for improvement. In particular, implementing liquid cooling of a power converter tends to create various mechanical and structural challenges to packaging the electronic components compactly, while still allowing for sufficient heat rejection.

U.S. Pat. No. 7,068,507 to Pfeifer et al. proposes an electronic converter assembly including a liquid cooled heat sink. Pfeifer et al. illustrate a plurality of cylindrical capacitors and power switches which are apparently adapted to condition electrical power in a manner similar to that described above, namely, receiving AC input, converting the AC input to DC, then outputting AC power suited for powering electrically powered components. The design of Pfiefer et al., such as is illustrated in FIGS. 2 and 3, appears dictated at least in part by the cooling strategy chosen. In other words, an arrangement of the electronic components appears to have been based at least in part on the preexisting design of the cooling plate. While Pfiefer et al. may be successful in certain instances, the design is apparently purpose built for a particular cooling strategy and for certain types of electronic components, rendering it inferior or inapplicable to others.

SUMMARY

In one aspect, a method of assembling a power converter for a multiple-phase electric drive propulsion system in a machine includes arranging a plurality of rectangular capacity units of a capacitor subassembly for conditioning electrical power in the power converter in a first packaging arrangement. Arranging the plurality of rectangular capacitor units includes orienting major capacitor axes of each one of the capacitor units co-linear with one another and orienting minor capacitor axes of each one of the capacitor units parallel but not co-linear with one another. The method further includes arranging a plurality of IGBT modules of a transistor subassembly for power switching in the power converter in a second packaging arrangement, including orienting major module axes of each one of the IGBT modules parallel but not co-linear with one another and orienting minor module axes of each one of the IGBT modules co-linear with one another. Arranging the plurality of IGBT modules further includes positioning a rectangular heat dissipation surface of each one of the IGBT modules in a common heat transference plane. The method further includes supporting the capacitor subassembly in the first packaging arrangement and supporting the transistor subassembly in the second packaging arrangement.

In another aspect, a method of making a power converter for a multiple phase electric drive propulsion system in a machine includes establishing a first packaging arrangement for a capacitor subassembly adapted for conditioning electrical power in the power converter. The first packaging arrangement includes a first heat dissipation/packing density configuration where major capacitor axes of each of a plurality of rectangular capacitor units of the capacitor subassembly are oriented co-linear with one another and where minor capacitor axes of each of the rectangular capacitor units are oriented parallel but not co-linear with one another. The method further includes establishing a second packaging arrangement for a transistor subassembly adapted for power switching in the power converter. The second packaging arrangement includes a second heat dissipation/packing density configuration where major module axes of each of a plurality of IGBT modules of the transistor subassembly are oriented parallel but not co-linear with one another, where minor module axes of each of the IGBT modules are oriented co-linear with one another and where rectangular heat dissipation surfaces of each of the IGBT modules are positioned in a common heat transference plane. The method further includes coupling the capacitor subassembly in the first packaging arrangement with the transistor subassembly in the second packaging arrangement, for service in a power converter housing.

In still another aspect, a power converter for a multiple phase electric drive propulsion system in a machine includes a capacitor subassembly for conditioning electrical power in the power converter. The capacitor subassembly includes a plurality of capacitor units each having a rectangular configuration and defining a major capacitor axis and a minor capacitor axis which is oriented normal to and bisects the major capacitor axis. The capacitor subassembly includes a first packaging arrangement where each of the major capacitor axes are co-linear with one another and each of the minor capacitor axes are parallel but not co-linear with one another. The power converter further includes a transistor subassembly for power switching in the power converter and including a plurality of IGBT modules each defining a major module axis and a minor module axis which is oriented normal to and bisects the major module axis. The plurality of IGBT modules each further include an upper module side and a lower module side opposite the upper module side which includes a heat dissipation surface having a rectangular configuration. The transistor subassembly includes a second packaging arrangement where each of the minor module axes are co-linear with one another and each of the major module axes are parallel but not co-linear with one another and each of the heat dissipation surfaces are positioned in a common heat transference plane. The power converter further includes a support mechanism adapted to support the capacitor subassembly in the first packaging arrangement and to support the transistor subassembly in the second packaging arrangement.

In still another aspect, an electronics package for a power converter of an electric drive propulsion system in a machine includes a capacitor subassembly for conditioning electrical power in the power converter. The capacitor subassembly includes a plurality of capacitor units each having a rectangular configuration and defining a major capacitor axis and a minor capacitor axis which is oriented normal to and bisects the major capacitor axis. The capacitor subassembly includes a first packaging arrangement where each of the major capacitor axes are co-linear with one another and each of the minor capacitor axes are parallel but not co-linear with one another. The electronics package further includes a transistor subassembly for power switching in the power converter and including a plurality of IGBT modules each defining a major module axis and a minor module axis which is oriented normal and bisects the major module axis. The plurality of IGBT modules each further include an upper module side and a lower module side opposite the upper module side. The transistor subassembly includes a second packaging arrangement where each of the minor module axes are co-linear with one another and each of the major module axes are parallel but not co-linear with one another. The electronics package further includes a heat dissipation mechanism for cooling the electronics package including a plurality of rectangular heat transference panels connected one with each of the IGBT modules on the corresponding lower module side thereof and each including a planar heat dissipation surface.

BRIEF DESCRIPTION OF THE DRAWINGS

Each of the illustrations described below is pictorial in nature and is not intended to be an exact representation of any actual components.

DETAILED DESCRIPTION

Figure 1:
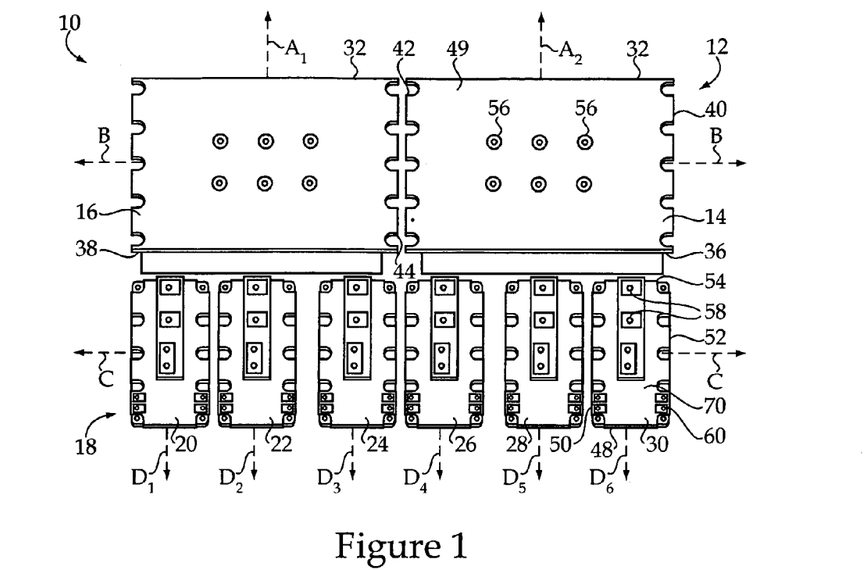
FIG. 1 illustrates an electronics assembly for a power converter, according to one embodiment.

Referring to FIG. 1, there is shown an electronics assembly 10 according to one embodiment. The electronics assembly 10 may be used in a power converter such as a power converter for a multiple phase AC electric drive propulsion system in a machine, as further described herein. Electronics assembly 10 may include a capacitor subassembly 12 for conditioning electrical power in a conventional manner in a power converter. Capacitor subassembly 12 may include a plurality of capacitor units 14 and 16 each having a rectangular configuration and defining a major capacitor axis and a minor capacitor axis which is oriented normal to and bisects the corresponding major capacitor axis. Electronics assembly 10 may further include a transistor subassembly 18 for power switching in a power converter in a conventional manner, and including a plurality of transistor modules each defining a major module axis and a minor module axis which is oriented normal to and bisects the major module axis. The plurality of transistor modules may each include an insulated gate bipolar transistor module, a variety of which are well known and widely used in electrical power systems, and referred to hereinafter as "IGBT" modules. As will be further apparent from the following description, the components of electronics assembly 10, including those shown in FIG. 1 and also other components described below, may be uniquely arranged to enable heat dissipation during operation, while being positioned in a relatively dense and compact configuration.

To this end, capacitor subassembly 12 may include a first packaging arrangement where each of the major capacitor axes are co-linear with one another and each of the minor capacitor axes are parallel but not co-linear with one another. In FIG. 1, the rectangular configuration of each one of capacitor units 14 and 16 is readily apparent. Capacitor unit 16 defines a minor capacitor axis $A_1$ and capacitor unit 14 defines a minor capacitor axis $A_2$. It may be noted that minor capacitor axes $A_1$ and $A_2$ are oriented parallel with one another and are not co-linear. Axis B is shown as common to each of capacitor units 14 and 16 and represents the co-linear major axes of each of capacitor units 14 and 16. It should be appreciated that the term "minor capacitor axis" as used herein refers to an axis defined by the corresponding capacitor unit 14, 16 which extends through a geometric center thereof and intersects long sides of the corresponding rectangular configuration as shown. The term "major capacitor axis" as used herein refers to an axis defined by the corresponding capacitor unit which intersects the geometric center of the corresponding capacitor unit and also intersects short sides of the corresponding rectangular configuration. It may further be noted from FIG. 1 that each of the plurality of IGBT modules 20-30 also include a generally rectangular configuration. The terms "major module axis" and "minor module axis" are used herein in a manner consistent with use of the corresponding terms in regard to capacitor units 14 and 16. In other words, the major module axes, identified respectively for each of IGBT modules 20-30 via axes $D_1$-$D_6$, intersect a geometric center of the corresponding IGBT module and also intersect short sides of the rectangular configuration. Similarly, the term minor module axis refers to an axis intersecting a geometric center of the corresponding IGBT module and also intersecting long sides of the corresponding rectangular configuration. Example locations of major capacitor axes, minor capacitor axes, major module axes and minor module axes, will be further apparent from an examination of the attached drawings as well as the following description. In any event, in electronics assembly 10 transistor subassembly 18 may include a second packaging arrangement where each of the minor module axes, shown via axis C, are co-linear with one another, and each of major module axes $D_1$-$D_6$ are parallel but not co-linear with one another. It may be noted that major module axes $D_1$-$D_6$ are oriented parallel, but not coplanar with minor capacitor axes $A_1$ and $A_2$. Further, major capacitor axes B may be oriented normal to and non-coplanar with major module axes $D_1$-$D_6$. This configuration is also apparent in FIG. 2. Further, in the second packaging arrangement of transistor subassembly 18, each of a plurality of planar heat dissipation surfaces 75 associated one with each of IGBT modules 20-30 may be positioned in a common heat transference plane, as further described herein.

In one embodiment, capacitor subassembly 12 may include a total of two identical capacitor units. Each of capacitor units 14 and 16 may include a plurality of peripheral edges which define a rectangular configuration thereof. Capacitor unit 14 may include a first peripheral edge 32 which includes a first long peripheral edge and a second peripheral edge 36 which includes a second long peripheral edge. Capacitor unit 14 may further include a third peripheral edge 40 which includes a first short peripheral edge and a fourth peripheral edge 42 which includes a second short peripheral edge. Capacitor unit 16 may include a first peripheral edge 34 which includes a first long peripheral edge, a second peripheral edge 38 which includes a second long peripheral edge, a third peripheral edge 46 which includes a first short peripheral edge and a fourth peripheral edge 44 which includes a second short peripheral edge. Each of capacitor units 14 and 16 may further include a set of electrical capacitor connectors 56 which are located on an upper side 49 of the corresponding capacitor unit. It may be noted that upper side 49 includes a rectangular edge portion 57 which overhangs a main body portion 59. It should be appreciated that the present description of the rectangular configuration of capacitor units 14 and 16, and definitions for axes $A_1$, $A_2$ and C, refer to main body portion 59. Capacitor unit 16 may include a similar edge portion and main body portion to capacitor unit 14. In one embodiment, each of capacitor units 14 and 16 may include a "Swiss roll" comprised of a conductive metal and dielectric material familiar to those skilled in the art, which is squeezed or otherwise deformed or arranged during manufacturing into a roughly rectangular shape, and positioned within potting material via known techniques to render the generally rectangular configuration of the main body portion 59 of the corresponding capacitor unit. In one embodiment, each of capacitor units 14 and 16 may include a total of six electrical capacitor connectors which connect with the corresponding "Swiss roll" within the respective capacitor unit.

Transistor subassembly 18 may include a total of six IGBT modules in one embodiment. IGBT modules 20-30 may be identical IGBT modules and, hence, the following description of the single IGBT module 30 should be understood to refer similarly to each of the other five IGBT modules. IGBT module 30 may include a plurality of peripheral edges, which define a generally rectangular configuration, including a first peripheral edge 52 or first long edge and a second peripheral edge 50 or second long edge. IGBT module 30 may further include a third peripheral edge 48 or first short edge and a fourth peripheral edge 54 or second short edge. IGBT module 30 may further include a plurality of electrical power connectors 58 for connecting with capacitor subassembly 12 and for connecting with power input and output components of a power converter, as further described herein.

Figure 3A:
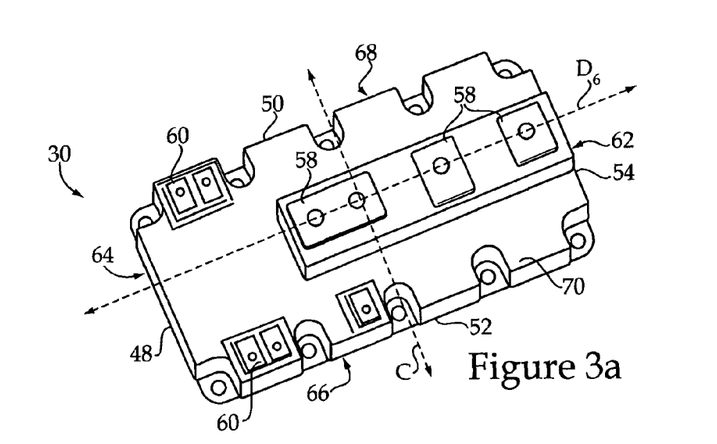
FIG. 3a illustrates an IGBT module which may be used with the electronics assembly of FIGS. 1 and 2.
Figure 3B:
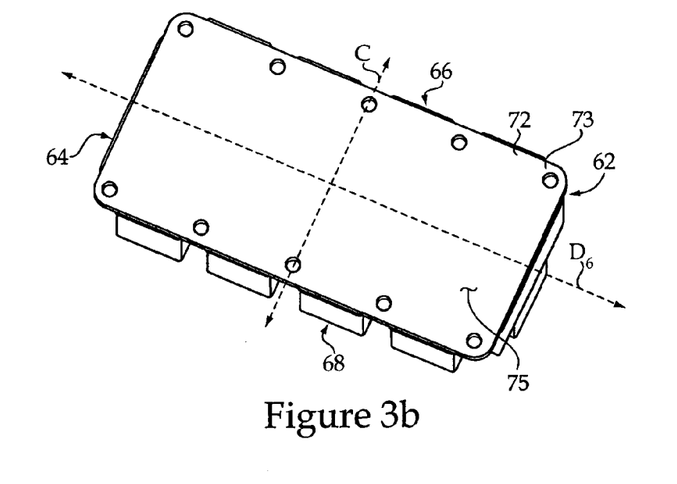
FIG. 3b illustrates the IGBT module of FIG. 3a in a different view.

Referring also to FIG. 3a and FIG. 3b, IGBT module 30 may include an upper module surface or upper module side 70 and a lower module surface or lower module side 72. In one embodiment, lower module side 72 may include a heat dissipation surface 75 defining a rectangular configuration as shown. IGBT module 30 may further include a first module end 64 corresponding to peripheral edge 48 and a second module end 62 corresponding to peripheral edge 54. Lower module side 72 may include a rectangular heat transference panel 73 formed of a thermally conductive material, such as a metallic material, whereupon heat dissipation surface 75 is located. IGBT module 30 may also include a first lateral module side 66 corresponding to peripheral edge 52 and a second lateral module side 68 corresponding to peripheral edge 50. It may be noted from the FIG. 3a illustration that major module axis $D_6$ intersects peripheral edge 54 at module end 62 and also intersects peripheral edge 48 at module end 64. Minor module axis C intersects peripheral edge 52 at lateral module side 66 and intersects peripheral edge 50 at lateral module side 68.

FIG. 3a further illustrates an arrangement of electrical power connectors 58 which is asymmetric about a plane which includes minor module axis C and is oriented normal to major module axes $D_1$-$D_6$. An arrangement of electrical power connectors 58 may be understood to define a module orientation of IGBT module 30. Returning to FIG. 1, it may be noted that each of IGBT modules 20-30 may include an identical module orientation within the second packaging arrangement, as defined by an arrangement of their respective electrical power connectors 58. Each of IGBT modules 20-30 may further include an orientation where a module end, such as module end 54, having one of electrical power connectors 58 located adjacent thereto, is positioned adjacent to and abuts capacitor subassembly 12. As used herein, the term "abuts" should not be understood to strictly mean that the respective parts must be touching. Rather, "abuts" means that the subject components are adjacent, and no additional electronics components are positioned between IGBT modules 20-30 and capacitor subassembly 12.

Figure 2:
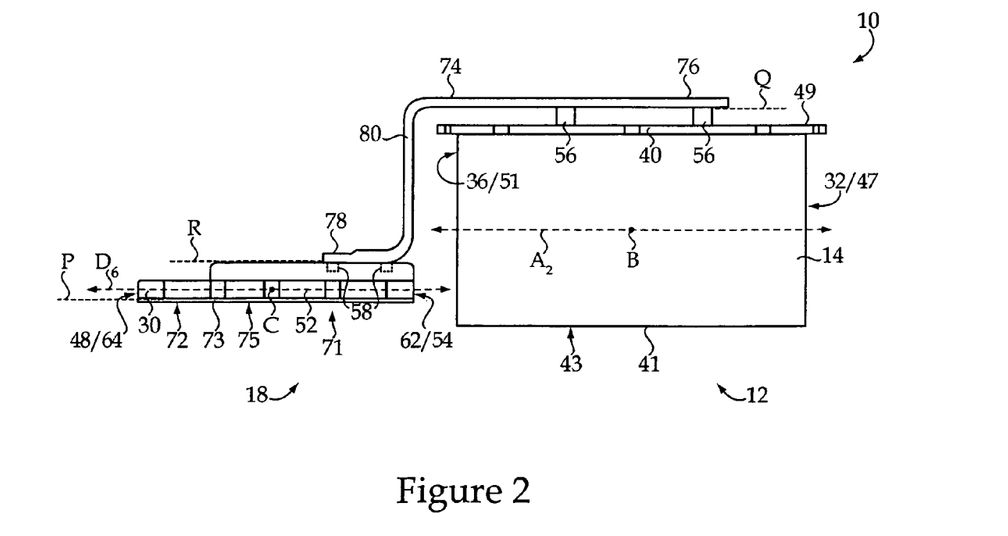
FIG. 2 illustrates a side view of a portion of the assembly of FIG. 1.

Turning now to FIG. 2, there is shown a side view of electronics assembly 10 as it might appear when coupled with an electrical connecting device such as a DC bus bar 74. It may be noted from FIG. 2 that capacitor unit 14 includes a plurality of lateral sides of main body portion 59 which each include a surface located thereon. As further described herein, the lateral sides/surfaces of each capacitor unit 14, 16 may include heat transference surfaces for dissipating heat from the corresponding capacitor unit to a heat exchange element such as a power converter housing. In particular, main body portion 59 of capacitor unit 14 is shown having an end surface 41, a lower surface 43, a first side surface 47 and a second side surface 51. Side surfaces 47 and 51 may correspond with long peripheral edges 32 and 36, respectively, whereas end surface 41 may correspond with short peripheral edge 40. It may further be noted that electrical capacitor connectors 56 project upwardly from upper side 49 of capacitor unit 14 and define a first connecting plane "Q". Electrical power connectors 58 of IGBT module 30 are also shown, and define a second connecting plane "R" which may be parallel and non-coplanar with plane Q in one embodiment.

A heat transference plane "P" corresponding to the heat transference plane occupied by the heat dissipation surface 75 of each of IGBT modules 20-30 is also shown in FIG. 2. As discussed above, heat dissipation surface 75 may be a surface of panel 73. Together, the heat dissipation surfaces/panels 75 and 73 of each of IGBT modules 20-30 may include or comprise a portion of a heat dissipation mechanism 71 of electronics assembly 10. It may be noted that heat transference plane P may be parallel with each of planes Q and R, and non-coplanar therewith. In one embodiment, DC bus bar 74 may include a first bus bar end 76 located in first connecting plane Q and electrically connecting with electrical capacitor connectors 56. DC bus bar 74 may further include a second bus bar end 78 located in second connecting plane R and electrically connecting with electrical power connectors 58. DC bus bar 74 may also include a stepped profile defined by a middle portion 80 between DC bus bar end 76 and DC bus bar end 78. It may be noted that a configuration of DC bus bar 74 may define a relative location and orientation among planes Q, R and P in one embodiment. The stepped profile of DC bus bar 74 may include a stepped cross sectional profile in one embodiment. As will be further apparent from FIGS. 4 and 6, DC bus bar 74 may also include a stepped edge profile between DC bus bar end 76 and DC bus bar end 78. DC bus bar 74 may include two laminated conductive sheets electrically separate from one another in one embodiment, and may be preconfigured during manufacturing with a plurality of apertures/holes therein for electrically connecting with capacitor subassembly 12 and transistor subassembly 18. DC bus bar 74 may further be understood as a supporting mechanism which supports capacitor subassembly 12 in the first packaging configuration via its mechanical/electrical connections therewith, and also supports transistor subassembly 18 in the second packaging configuration via its electrical/mechanical connections therewith.

Figure 4:
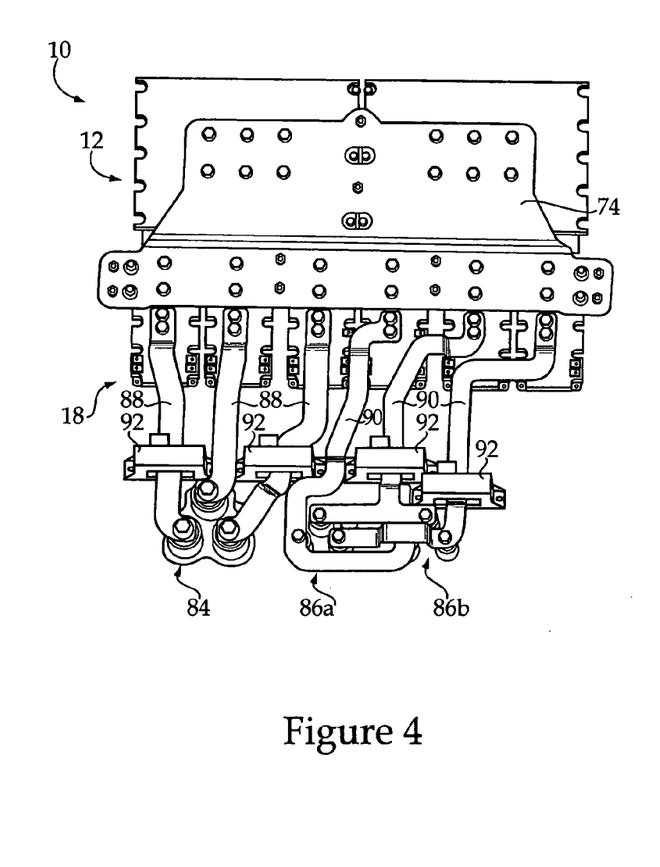
FIG. 4 illustrates an electronics assembly for a power converter, according to one embodiment.

Turning now to FIG. 4, there is shown electronics assembly 10 in a top view assembled with other components in preparation for placing in service in a power converter housing. It may be noted from FIG. 4 that a plurality of AC electrical connection bars 88 may connect three IGBT modules of transistor subassembly 18 with an AC input interface 84. AC input interface 84 may receive a multiple phase AC input, such as a three-phase AC input, from a source of electrical power such as an electrical generator. The three IGBT modules 20, 22 and 24 of transistor subassembly 18 coupled with AC input interface 84 may comprise a power converter which transforms AC input to DC at capacitor subassembly 12. A plurality of AC electrical connection bars 90 connect a second three of IGBT modules 26, 28, 30 of transistor subassembly 18 with a first AC output interface 86a and a second AC output interface 86b. The three IGBT modules 26, 28, 30 connecting with AC output interfaces 86a and 86b may comprise a power inverter which transforms DC from the capacitor subassembly 12 to AC output. AC output interfaces 86a and 86b may be configured to connect with an electrically powered device, as further described herein. During braking (slowing) an electric drive machine which employs electronics assembly 10, the direction of power flow may be changed such that AC interface 84 acts as an AC output interface and AC interfaces 86a and 86b act as AC input interfaces. A plurality of current sensors 92 may be provided which are coupled with electrical connection bars 88 and 90 in a conventional manner.

Figure 5:
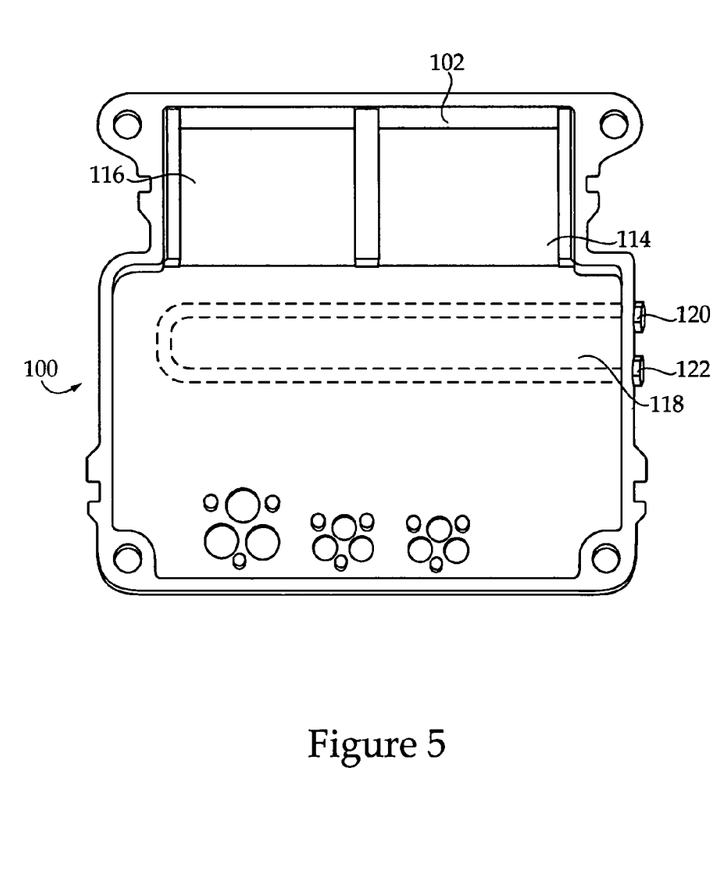
FIG. 5 illustrates a power converter housing, according to one embodiment.

Turning to FIG. 5, there is shown a power converter housing 100 according to one embodiment. Power converter housing 100 may include a cast metallic housing formed, for example, of a relatively highly heat conductive material such as aluminum. Power converter housing 100 may include a liquid cooled housing which is configured to receive electronics assembly 10 and fluidly seal electronics assembly 10 therein via a power converter housing cover (not shown). Power converter housing 100 may further include a liquid inlet fitting 120 adapted to receive a cooling liquid for circulation via an internal cooling circuit of power converter housing 100, and may further include a liquid outlet 122 for discharging liquid after flowing through power converter housing 100 to a radiator or the like. Power converter housing 100 may further include an inner surface 102. In one embodiment, inner surface 102 may serve as a support mechanism in addition or alternatively to DC bus bar 74 for supporting capacitor subassembly 12 in the first packaging arrangement and for supporting transistor subassembly 18 in the second packaging arrangement. In one embodiment, capacitor subassembly 12 may be positioned within power converter housing 100 such that surfaces 43, 41, 47 and 51 of capacitor unit 14 are in heat transference contact with inner surface 102. Capacitor unit 16 may have corresponding surfaces which are similarly in heat transference contact with inner surface 102. It may also be noted that each of capacitor units 14 and 16 includes a lateral side corresponding with peripheral edges 42 and 44, respectively. This lateral side, which is not visible in the drawings, will also be in heat transference contact with inner surface 102 when capacitor subassembly 12 is received in power converter housing 100. Power converter housing 100 may further include a first well 114 which is defined by inner surface 102 and corresponds with capacitor unit 14, and a second well 116 also defined by inner surface 102 which corresponds with capacitor unit 16. Power converter housing 100 may still further include a heat transference surface 118 which is part of inner surface 102. Heat transference surface 118 is configured to contact each heat dissipation surface 75 of each of the IGBT modules of transistor subassembly 18. In one embodiment, a suitable thermal grease or the like may be used to coat surfaces of power converter housing 10 which contact components of electronics assembly 10. Power converter housing 100 may include a single piece cast molding in one embodiment, where inner surface 102 is a molded inner surface shaped in a manner which corresponds with the first packaging configuration of capacitor subassembly 12 and also corresponds with the second packaging configuration of transistor subassembly 18.

Figure 6:
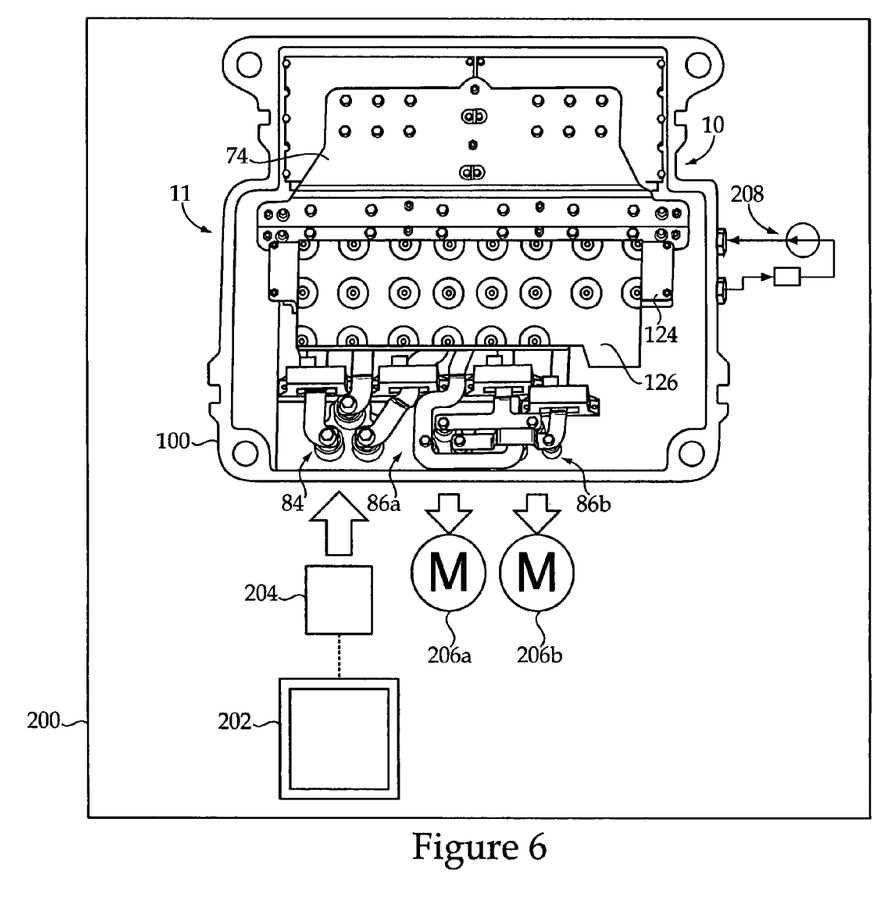
FIG. 6 is a diagrammatic view of a machine having an electrical propulsion system, according to one embodiment.

Turning now to FIG. 6, there is shown a machine 200 which includes a combustion engine such as an internal combustion engine 202 coupled with and configured to power an electrical generator 204. Electrical generator 204 may include a three-phase electrical generator which is adapted to supply electrical power to AC input interface 84 in a conventional manner. Machine 200 may further include one or more electric propulsion motors, and in one embodiment may include a first electric propulsion motor 206a coupled with AC output interface 86a and a second electric propulsion motor 206b coupled with AC output interface 86b. In one embodiment, machine 200 may include a mobile machine such as a track-type tractor or the like having propulsion motors 206a and 206b coupled with ground engaging elements (not shown), however, the present disclosure is not thereby limited. Thus, in one embodiment electric propulsion motors 206a and 206b might be traction motors. Also shown in FIG. 6 is power converter housing 100 having assembled electronics assembly 10 positioned therein, to form a power converter 11. In one embodiment, a bridge 124 may be positioned within power converter housing 100 and may include a printed control board 126 mounted thereon. Printed control board 126 may connect with electrical control connectors 60 for controlling power switching in each IGBT module 20-30, and may be further configured to connect via a wiring harness or the like with a control module positioned outside of power converter housing 100.

Returning briefly to FIG. 2, it may be recalled that first connecting plane Q and second connecting plane R are parallel but non-coplanar. In one embodiment, control board 126 and bridge 124 may be positioned at least partially between first connecting plane Q and second connecting plane R, resulting in a compact arrangement. A cooling system 208 may be provided as shown in FIG. 6 which is adapted to circulate a cooling liquid through power converter housing 100 for cooling components of electronics assembly 10. It will further be recalled that a cover for power converter housing 100 may be provided which is adapted to fluidly seal electronics assembly 10 therein, for protection from dirt, debris, mechanical damage, water, etc.

INDUSTRIAL APPLICABILITY

The present disclosure contemplates assembling a power converter which includes electronics assembly 10 for service in a new power system such as an electric propulsion system, as well as in a repaired or remanufactured electric power system. When a power converter from an electric propulsion system is removed from service, it may be expected that certain of the components need to be replaced, either as a preventative measure or because the components have in fact been damaged or degraded in performance. To this end, to repair or remanufacture a power converter according the present disclosure each of the various components of electronics assembly 10 may be removed from a power converter housing, and the housing may be inspected, cleaned, etc.

Certain components, such as DC bus bar 74 and AC electrical connection bars 88 and 90, may be reusable. In other instances, these components might be replaced due to corrosion, etc. To optimize future service life, and limit the risk of further problems, capacitor subassembly 12 and transistor subassembly 18 may each be replaced prior to returning the associated power converter to service. New capacitor units such as capacitor units 14 and 16 may be obtained, and arranged in the first packaging arrangement as described herein. New IGBT modules such as IGBT modules 20-30 may be obtained, and arranged in the second packaging arrangement as described herein. Capacitor subassembly 12 and transistor subassembly 18 may then be positioned as an assembled package in contact with housing 100 and coupled with DC bus bar 74 for subsequent service in a power converter.

In one embodiment, the first packaging arrangement may include a first heat dissipation/packing density configuration. In designing and/or making a power converter according to the present disclosure, the first packaging arrangement may be established or selected based on a plurality of different, and to a certain extent competing, concerns. One factor in establishing a suitable packaging configuration for capacitor subassembly 12 may include minimizing volume occupied by capacitor subassembly 12. A potentially competing concern may include providing for sufficient heat dissipation in a service environment. In most embodiments, packing density for capacitor subassembly 12 will tend to be a relatively larger concern than heat dissipation. In other words, while capacitor subassembly 12 will tend to produce heat during operation, capacitor subassembly 12 may have a relatively tightly packed configuration. Further still, capacitor subassembly 12 needs to have sufficient electrical storage capacity and needs to be positioned and shaped so that the overall shape of electronics assembly 10 when assembled enables robust and reliable electrical connections with transistor subassembly 18 to be readily made. The selection of two identical capacitor units 14, 16 having rectangular configurations, packing them relatively closely together so that they contact housing 100 on five of their six sides and orienting the major capacitor axes and minor capacitor axes as described herein addresses the various concerns which bear on selection of a suitable packaging arrangement for capacitor subassembly 12.

The second packaging arrangement may include a second heat dissipation/packing density configuration. The second packaging arrangement may likewise be established or selected based upon the concerns of minimizing a volume occupied by transistor subassembly 18 while still also allowing for sufficient heat dissipation. In contrast to capacitor subassembly 12, heat dissipation will tend to be of relatively greater concern in establishing a packaging arrangement for transistor subassembly 18 than will packing density. This is due in part to the relatively high level of heat generated by transistor subassembly 18. Ease of establishing appropriate electrical connections with transistor subassembly may also be a factor, as well as how the shape of transistor subassembly 18 and the shape of capacitor subassembly 12 relate in three-dimensional space. The selection of six identical rectangular IGBT modules 20-30, arranging IGBT modules 20-30 in identical orientations, orienting heat dissipation surface(s) 72 in a common heat transference plane and orienting the major module axes and minor module axes as described herein address the various concerns which bear on selection of a suitable packaging arrangement for transistor subassembly 18.

For the reasons described above, it may thus be appreciated that a variety of concerns bear on exactly how capacitor subassembly 12 and transistor subassembly 18 are respectively packaged. Other concerns relate to how transistor subassembly 18 and capacitor subassembly 12 are positioned in three-dimensional space relative to one another. It will generally be desirable to position capacitor subassembly 12 relatively close to transistor subassembly 18 to limit inductance between electrical conductors of electronics assembly 10. In one embodiment, connecting capacitor subassembly 12 with transistor subassembly 18 may include electrically connecting capacitor subassembly 12 with transistor subassembly 18 in an inductance limiting arrangement, such as by connecting capacitor subassembly 12 with transistor subassembly 18 by way of DC bus bar 74, and placing transistor subassembly 18 such that it abuts capacitor subassembly 12. It will generally be desirable to position capacitor subassembly 12 and transistor subassembly 18 as close together as possible. Positioning capacitor subassembly 12 and transistor subassembly 18 close together, however, will typically need to be tempered by the need to dissipate heat and also by the need for a relatively straightforward and robust mechanism for establishing electrical connections therebetween. Accordingly, the described shape of DC bus bar 74, including its stepped profile enables positioning transistor subassembly 18 such that a first module end illustrated via first module end 54 of IGBT module 30 abuts capacitor subassembly 14. This general configuration has been shown to limit inductance between and among the components, while also addressing the concerns of heat dissipation and packing density. Still another concern in positioning capacitor subassembly 12 and transistor subassembly 18 in three-dimensional space relates to providing a compact arrangement which accommodates control board 126 and bridge 124. As described above, control board 126 and bridge 124 may be positioned at least partially between planes Q and R, addressing this concern.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of assembling a power converter for a multiple-phase electric drive propulsion system in a machine comprising:

arranging a plurality of rectangular capacitor units of a capacitor subassembly for conditioning electrical power in the power converter in a first packaging arrangement, including orienting major capacitor axes of each one of the capacitor units co-linear with one another and orienting minor capacitor axes of each one of the capacitor units parallel but not co-linear with one another;

arranging a plurality of IGBT modules of a transistor subassembly for power switching in the power converter in a second packaging arrangement, including orienting major module axes of each one of the IGBT modules parallel but not co-linear with one another and orienting minor module axes of each one of the IGBT modules co-linear with one another;

wherein arranging the plurality of IGBT modules further includes positioning a rectangular heat dissipation surface of each one of the IGBT modules in a common heat transference plane; and supporting the capacitor subassembly in the first packaging arrangement and supporting the transistor subassembly in the second packaging arrangement.

2. The method of claim 1 wherein:

arranging the capacitor subassembly further includes locating electrical capacitor connectors of the first rectangular capacitor unit and locating electrical capacitor connectors of the second rectangular capacitor unit in a first connecting plane;

arranging the transistor subassembly further includes locating electrical power connectors of the plurality of IGBT modules in a second connecting plane which is parallel and non-coplanar with the first connecting plane and parallel and non-coplanar with the heat transference plane; and the method further comprises electrically connecting the electrical capacitor connectors with the electrical power connectors via a DC bus bar having a first bus bar end located in the first connecting plane and a second bus bar end located in the second connecting plane and a stepped profile between the first bus bar end and the second bus bar end.

3. The method of claim 2 further comprising positioning a control board at a mounting location between the first connecting plane and the second connecting plane, and supporting the control board in the mounting location.

4. The method of claim 1 wherein supporting the capacitor subassembly and supporting the transistor subassembly further include contacting the capacitor subassembly and contacting the transistor subassembly with a surface of a support mechanism having a surface shape corresponding to the first packaging configuration and also corresponding to the second packaging configuration.

5. The method of claim 4 wherein supporting the capacitor subassembly and supporting the transistor subassembly further include contacting the capacitor subassembly and contacting the transistor subassembly with a molded inner surface of a power converter housing which includes a heat transference surface contacting each of the heat dissipation surfaces in the heat transference plane.

6. The method of claim 5 wherein:

supporting the capacitor subassembly in the first packaging arrangement further includes receiving a first rectangular capacitor unit within a first rectangular well defined by the inner surface of the power converter housing and receiving a second rectangular capacitor unit within a second rectangular well defined by the inner surface of the power converter housing; and supporting the transistor subassembly in the second packaging arrangement further includes contacting the heat dissipating surface of each one of the plurality of IGBT modules with a heat transference surface of the inner surface of the power converter housing.

7. A method of making a power converter for a multiple phase electric drive propulsion system in a machine comprising:

establishing a first packaging arrangement for a capacitor subassembly adapted for conditioning electrical power in the power converter, the first packaging arrangement including a first heat dissipation/packing density configuration where major capacitor axes of each of a plurality of rectangular capacitor units of the capacitor subassembly are oriented co-linear with one another and where minor capacitor axes of each of the rectangular capacitor units are oriented parallel but not co-linear with one another;

establishing a second packaging arrangement for a transistor subassembly adapted for power switching in the power converter, the second packaging arrangement including a second heat dissipation/packing density configuration where major module axes of each of a plurality of IGBT modules of the transistor subassembly are oriented parallel but not co-linear with one another, where minor module axes of each of the IGBT modules are oriented co-linear with one another and where rectangular heat dissipation surfaces of each of the IGBT modules are positioned in a common heat transference plane; and coupling the capacitor subassembly in the first packaging arrangement with the transistor subassembly in the second packaging arrangement, for service in a power converter housing.

8. The method of claim 7 further comprising supporting the plurality of capacitor units in the first packaging arrangement such that electrical connectors of each of the plurality of capacitor units define a first connecting plane, and supporting the plurality of IGBT modules in the second packaging arrangement such that electrical connectors of each of the plurality of IGBT modules define a second connecting plane which is parallel to and non-coplanar with the first connecting plane.

9. The method of claim 8 wherein supporting the plurality of capacitor units in the first packaging arrangement and supporting the plurality of IGBT modules in the second packaging arrangement further include supporting the plurality of capacitor units and the plurality of IGBT modules in an inductance limiting arrangement, and further comprising electrically connecting the capacitor subassembly with the transistor subassembly in the inductance limiting arrangement via a DC bus bar having a first bus bar end located in the first connecting plane, a second bus bar end located in the second connecting plane and a stepped profile between the first bus bar end and the second bus bar end.

10. A power converter for a multiple-phase electric drive propulsion system in a machine comprising:

a capacitor subassembly for conditioning electrical power in the power converter and including a plurality of capacitor units each having a rectangular configuration and defining a major capacitor axis and a minor capacitor axis which is oriented normal to and bisects the major capacitor axis, wherein the capacitor subassembly includes a first packaging arrangement where each of the major capacitor axes are co-linear with one another and each of the minor capacitor axes are parallel but not co-linear with one another;

a transistor subassembly for power switching in the power converter and including a plurality of IGBT modules each defining a major module axis and a minor module axis which is oriented normal to and bisects the major module axis, wherein the plurality of IGBT modules each further include an upper module side and a lower module side opposite the upper module side which includes a heat dissipation surface having a rectangular configuration;

wherein the transistor subassembly includes a second packaging arrangement where each of the minor module axes are co-linear with one another and each of the major module axes are parallel but not co-linear with one another and each of the heat dissipation surfaces are positioned in a common heat transference plane; and a support mechanism adapted to support the capacitor subassembly in the first packaging arrangement and to support the transistor subassembly in the second packaging arrangement.

11. The power converter of claim 10 wherein:

the capacitor subassembly includes a total of two identical capacitor units each including a lower side, a plurality of lateral sides and an upper side having a first plurality of electrical power connectors located thereon and defining a first connecting plane;

the transistor subassembly includes a total of six identical IGBT modules, each of the plurality of IGBT modules further includes a second plurality of electrical power connectors located on the corresponding upper side and defining a second connecting plane which is parallel and non-coplanar with the first connecting plane; and the power converter further comprises a DC bus bar having a first bus bar end located in the first connecting plane and electrically connecting with the first plurality of electrical connectors and a second bus bar end located in the second connecting plane and electrically connecting with the second plurality of electrical connectors, the DC bus bar further including a stepped profile between the first bus bar end and the second bus bar end.

12. The power converter of claim 11 wherein the stepped profile of the DC bus bar includes a stepped cross sectional profile.

13. The power converter of claim 12 wherein the second plurality of electrical connectors are positioned on the major module axis of the corresponding IGBT module, and wherein an arrangement of the second plurality of electrical connectors defines a module orientation, and wherein each of the IGBT modules has the same module orientation in the second packaging arrangement.

14. The power converter of claim 13 wherein:

each of the IGBT modules includes a first module end positioned adjacent the capacitor subassembly, and a second module end, the corresponding major module axis intersecting the first module end and the second module end, and wherein each of the plurality of IGBT modules includes a set of electrical control connectors located adjacent the second module end and positioned outboard of the major module axis; and the power converter further comprising a bridge having a control board positioned thereon and connecting with each of the electrical control connectors, the bridge supporting the control board at a mounting location between the first connecting plane and the second connecting plane.

15. The power converter of claim 14 wherein the support mechanism includes a power converter housing including an inner surface in heat transference contact with each of the heat dissipation surfaces of the plurality of IGBT modules and in heat transference contact with each of the lower side and the plurality of lateral sides of the two capacitor units.

16. An electronics package for a power converter of an electric drive propulsion system in a machine comprising:

a capacitor subassembly for conditioning electrical power in the power converter and including a plurality of capacitor units each having a rectangular configuration and defining a major capacitor axis and a minor capacitor axis which is oriented normal to and bisects the major capacitor axis, wherein the capacitor subassembly includes a first packaging arrangement where each of the major capacitor axes are co-linear with one another and each of the minor capacitor axes are parallel but not co-linear with one another;

a transistor subassembly for power switching in the power converter and including a plurality of IGBT modules each defining a major module axis and a minor module axis which is oriented normal to and bisects the major module axis, wherein the plurality of IGBT modules each further include an upper module side and a lower module side opposite the upper module side;

wherein the transistor subassembly includes a second packaging arrangement where each of the minor module axes are co-linear with one another and each of the major module axes are parallel but not co-linear with one another; and a heat dissipation mechanism for cooling the electronics package including a plurality of rectangular heat transference panels connected one with each of the IGBT modules on the corresponding lower module side thereof and each including a planar heat dissipation surface.

17. The electronics package of claim 16 wherein the capacitor subassembly includes a total of two identical capacitor units and the transistor subassembly includes a total of six identical IGBT modules, and wherein the transistor subassembly abuts the capacitor subassembly.

18. The electronics package of claim 17 wherein each of the major capacitor axes are oriented normal to and non-coplanar with each of the major module axes, and wherein each of the minor capacitor axes are oriented parallel to and non-coplanar with each of the major module axes.

19. The electronics package of claim 18 wherein:

each of the capacitor units includes a lower side, a plurality of lateral sides and an upper side having a first plurality of electrical power connectors located thereon and defining a first connecting plane;

each of the IGBT modules further includes a second plurality of electrical power connectors located on the corresponding upper side and defining a second connecting plane which is parallel and non-coplanar with the first connecting plane; and each of the planar heat dissipation surfaces is located in a common heat transference plane which is oriented parallel to the first connecting plane and the second connecting plane.

* * * * *